US008209568B2

(12) United States Patent
Marowsky-Bree et al.

(10) Patent No.: US 8,209,568 B2
(45) Date of Patent: Jun. 26, 2012

(54) SYSTEM AND METHOD FOR IMPLEMENTING AN INTELLIGENT BACKUP TECHNIQUE FOR CLUSTER RESOURCES

(75) Inventors: Lars Marowsky-Bree, Hamburg (DE); Andrew John Beekhof, Hallbergmoos (DE)

(73) Assignee: Novell, Inc., Provo, UT (US)

( * ) Notice: Subject to any disclaimer, the term of this patent is extended or adjusted under 35 U.S.C. 154(b) by 244 days.

(21) Appl. No.: 12/545,199

(22) Filed: Aug. 21, 2009

(65) Prior Publication Data

US 2011/0047405 A1 Feb. 24, 2011

(51) Int. Cl.
*G06F 11/00* (2006.01)
(52) U.S. Cl. ........................................................ 714/48
(58) Field of Classification Search .................... 714/15, 714/4.1, 4.11, 48; 709/223, 224; 711/162
See application file for complete search history.

(56) References Cited

U.S. PATENT DOCUMENTS

| 7,925,761 B2 * | 4/2011 | Marowsky-Bree et al. .. 709/226 |
| 2005/0081099 A1 * | 4/2005 | Chang et al. .................... 714/15 |
| 2008/0126829 A1 | 5/2008 | Robertson et al. |
| 2008/0243866 A1 * | 10/2008 | Pandey ............................ 707/10 |
| 2010/0312915 A1 * | 12/2010 | Marowsky-Bree et al. .. 709/248 |

OTHER PUBLICATIONS

FMS, Inc, "Error Numbers and Descriptions for Microsoft Access 2007", Copyright © 2008 FMS, Inc, pp. 1 and 13.*

* cited by examiner

*Primary Examiner* — Scott Baderman
*Assistant Examiner* — Yair Liebovich
(74) *Attorney, Agent, or Firm* — Haynes and Boone, LLP (57) ABSTRACT

Method and system for implementing a backup in a cluster comprising a plurality of interconnected nodes, at least one of the nodes comprising a cluster resource manager (CRM), and at least one of the nodes comprising a policy engine (PE), the PE maintaining at least one dependency associated with at least a first resource executing on at least one of the nodes. For example, the method comprises, receiving by the CRM a backup request for the first resource from an administrator; responsive to the request, updating by the CRM the cluster configuration; communicating by the CRM to the PE a cluster status and the updated configuration; providing by the PE to the CRM an instruction sequence for carrying out the backup, the instruction sequence based on the dependency associated with the first resource; and responsive to the instruction sequence, carrying out by the CRM the backup of the first resource.

13 Claims, 7 Drawing Sheets

SYSTEM AND METHOD FOR IMPLEMENTING AN INTELLIGENT BACKUP TECHNIQUE FOR CLUSTER RESOURCES

BACKGROUND

Clusters of servers or nodes are frequently used to deliver network services. In that regard, the clusters manage resources that provide services. Sometimes it is necessary or desirable to backup (or take a snapshot of) a resource in a cluster. In that regard, when performing backups or creating a snapshot of data, it is desirable to have a consistent data set. This requires that the processes which manage the data flush their caches, buffers, and queues to the persistent storage, so that this data remains consistent. Moreover, during the time the snapshot is created or the backup is running, the process or service should not process requests and operations that could dirty the data set and make it inconsistent. Therefore, the resources used by the service or process are briefly frozen to suspend operation and reach a consistent data state. Then, the resources are thawed to resume operation after the snapshot or backup is completed.

The foregoing situation is complicated by the fact that certain resources running on a node may have dependencies that affect the order in which resources must be frozen and thawed. Clearly, the need to properly sequence the freeze (suspend) and thaw (resume) of the resources creates complexity. Moreover, the foregoing situation is further complicated by the fact that in the event of a failure during freeze, backup, or thaw, it is desirable to perform node recovery. For example, the node may be shut down, cleaned up, and restarted. Additionally, the resources may also need to be shut down and restarted. However, if those resources have dependencies then an orderly recovery process requires a proper sequencing of stopping and starting the resource on the failed node and the other resources which are its dependencies. Therefore, a backup or snapshot of resources is further complicated by the need to recover from a failure during the freezing, backup, or thawing of a resource.

The foregoing situation is still further complicated by the fact that a resource may be distributed across multiple nodes. For example, in a clustered file system the file system is distributed across multiple nodes. In that regard, for orderly backup of the clustered file system it is desirable to coordinate the backup of each instance of the file system. In particular, it is desirable to coordinate the freeze of the distributed file system in a manner so that each instance of the file system is simultaneously frozen. Thereafter, it is desirable to coordinate the backup and thaw of the clustered file system in a manner so that each instance of the clustered file system is simultaneously backed-up and simultaneously thawed. Accordingly, in general it is desirable to coordinate the backup of a resource that is present on multiple nodes so that the backup is orderly.

SUMMARY

One embodiment is a method for implementing a backup technique in a cluster comprising a plurality of interconnected nodes, at least one of the nodes comprising a cluster resource manager, and at least one of the nodes comprising a policy engine, the policy engine maintaining at least one dependency associated with at least a first resource executing on at least one of the nodes. For example, the method comprises, receiving by the cluster resource manager a backup request for the first resource from an administrator of the cluster; responsive to receipt of the backup request, updating by the cluster resource manager the cluster configuration; communicating by the cluster resource manager to the policy engine a cluster status and the updated cluster configuration; providing by the policy engine to the cluster resource manager an instruction sequence for carrying out the requested backup, the instruction sequence being based on the dependency associated with the first resource; and responsive to receipt of the instruction sequence, carrying out by the cluster resource manager the requested backup of the first resource.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
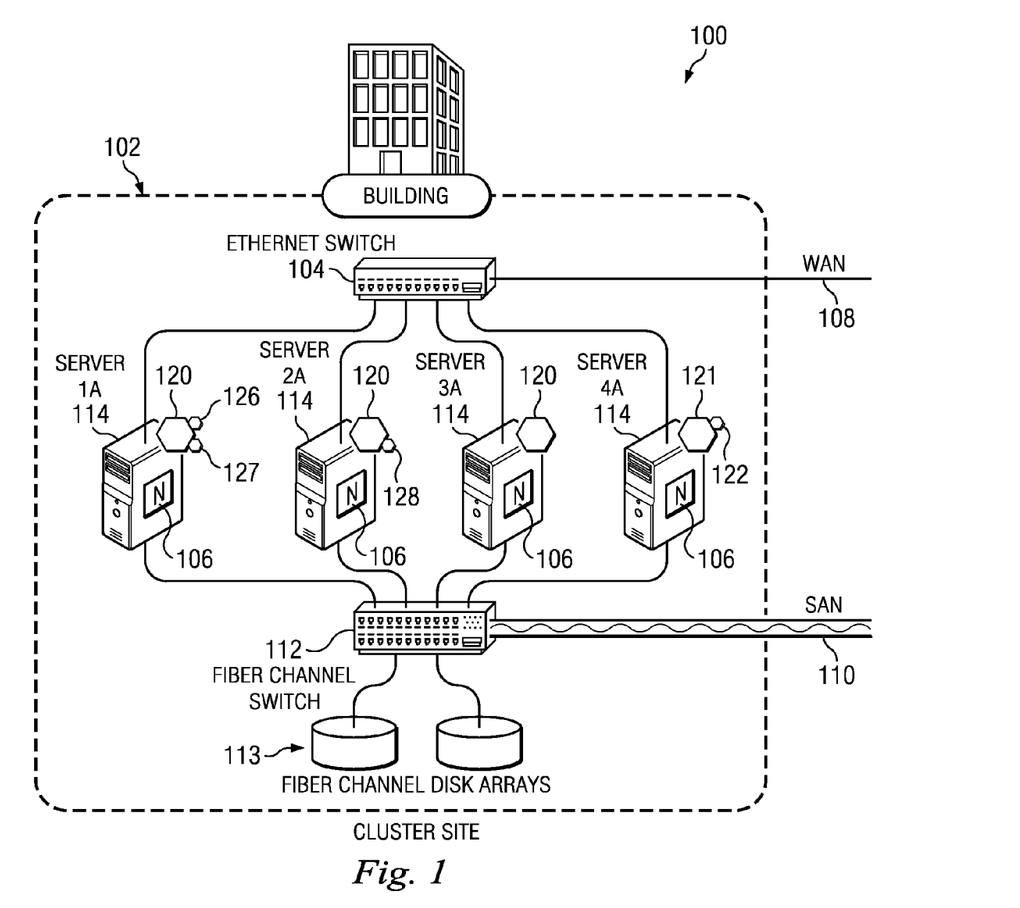
FIG. 1 is a block diagram of a cluster system that runs a three-tiered service, and in which an embodiment of a cluster resource backup technique may be implemented.

FIG. 1 illustrates a Business Continuity Clustering ("BCC") system 100 comprising an independent cluster 102. As illustrated in FIG. 1, the cluster 102 includes an Ethernet switch 104 for connecting a plurality of servers, or nodes, 106, to a wide area network ("WAN") 108. The servers 106 are connected to a storage area network ("SAN") 110 via a fiber channel switch 112. Moreover, the servers 106 are connected to fiber channel disk arrays 113. In accordance with features of one embodiment, each server 106 of the cluster 102 includes a business continuity engine ("BCE") 114. The BCEs 114 each comprise a system that provides a means of managing and controlling Business Continuity ("BC") applications. In accordance with features of one embodiment, each server 106 of the cluster 102 includes a BCE 114.

In the illustrated embodiment, the cluster 102 includes a cluster resource manager 120 that is present on each of the servers 1A, 2A, and 3A, and a cluster resource manager 121 that is present on server 4A. The cluster resource manager 121 is identical in all respects to the cluster resource manager 120, except that it has associated therewith a policy engine 122. The cluster resource managers 120, 121 are logical entities that manage all aspects of resource allocation for the delivery of services. Moreover, the cluster resource managers 120, 121 maintain an overview of the configuration of the cluster 102. In particular, the cluster resource manager 121 observes events in the cluster 102 and reports events to the policy engine 122. Moreover, the cluster resource manager 121 receives requests from a cluster resource administrator (not shown) and alters the cluster configuration accordingly as requested by the cluster resource administrator. The policy engine 122 includes and maintains dependencies of resources for the provision of resources and communicates with the cluster resource manager 121.

Further, in the illustrated embodiment the cluster 102 runs a three-tiered service that includes a web server, a database server, and a file system. In particular, node 1A runs the web server and the database server that each serve as a resource. The web server uses the database server to provide services and thus, in the present example the web server on node 1A is dependent on the database server on node 1A. Therefore, in normal operation the database server must be running in order for the web server resource to run properly. Conversely, before the cluster resource manager 121 suspends or stops the database server resource, first the web server resource must be respectively suspended or stopped. In greater detail, a resource agent 126 is present on the node 1A. The resource agent 126 facilitates communication between the cluster resource manager 121 and the web server that runs on node 1A. Moreover, a resource agent 127 is also present on node 1A. The resource agent 127 facilitates communication between the cluster resource manager 121 and the database server that runs on node 1A.

In addition, the node 2A runs a file system that serves as a resource and that is used by the database server running on node 1A. Therefore, in the example under discussion the database server that runs on node 1A is dependent on the file system that is present on node 2A. Thus, in normal operation the file system resource must be running in order for the database server resource to run properly. Conversely, before the cluster resource manager 121 suspends or stops the file system resource, first the database server resource must be suspended or stopped, respectively. In greater detail, a resource agent 128 is present on node 2A. The resource agent 128 facilitates communication between the cluster resource manager 128 and the file system that runs on node 2A. In general, each of the resource agents 126, 127, and 128 facilitates communication between the cluster resource manager 121 and the respective resource that they each represent. For example, the resource agents 126, 127, and 128 receive start, stop, monitor, freeze (suspend), and thaw (resume) commands from the cluster resource manager 121 for managing the web server, database server, and file system resources.

Figure 2:
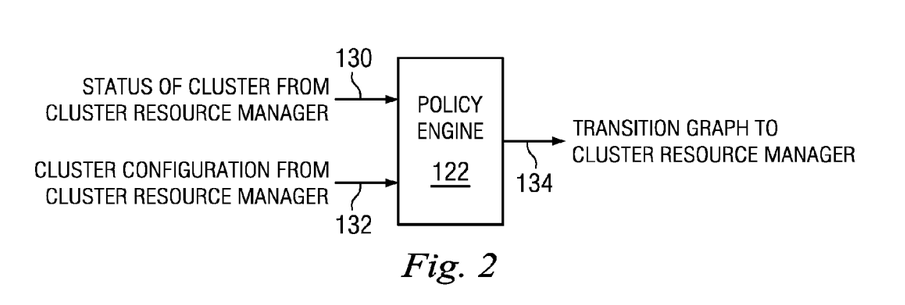
FIG. 2 is a block diagram of one embodiment of a policy engine of the cluster system of FIG. 1.

FIG. 2 provides additional details regarding the policy engine 122 shown in FIG. 1. In particular, FIG. 2 is a block diagram illustrating two inputs and an output of the policy engine 122 that are pertinent to an intelligent backup technique, described later in more detail. As shown in FIG. 2, the policy engine 122 receives a status of the cluster 102 from the cluster resource manager 121, via an input 130. The cluster status informs the policy engine 122 of the status of the cluster 102. For example, included in this information is the status of each node and resource in the cluster 102. Additionally, the policy engine 122 receives the configuration from one of the cluster resource managers 102, 121 as an input 132. For example, included in this information is the current or desired configuration of the cluster 102.

The policy engine 122 includes a set of dependencies regarding the resources in the cluster 102. For example, the policy engine 122 knows that the web server depends on the database server, and that the database server depends on the file system. In addition, the policy engine 122 operates on the status and configuration of the cluster 102 from inputs received from the cluster resource manager 121. Then, based on the dependencies maintained by the policy engine 122 and the status and configuration of the cluster 102, the policy engine 122 provides back to the cluster resource manager 121 the information necessary for the cluster resource manager 121 to provision resources and perform an intelligent backup. In this regard, the policy engine 122 provides a transition graph to the cluster resource manager 120, 121, as an output 134. The transition graph includes a set of actions and sequencing instructions that is used by the cluster resource manager 121 to implement an intelligent backup technique, as described later in further detail.

Figures 3, 4:
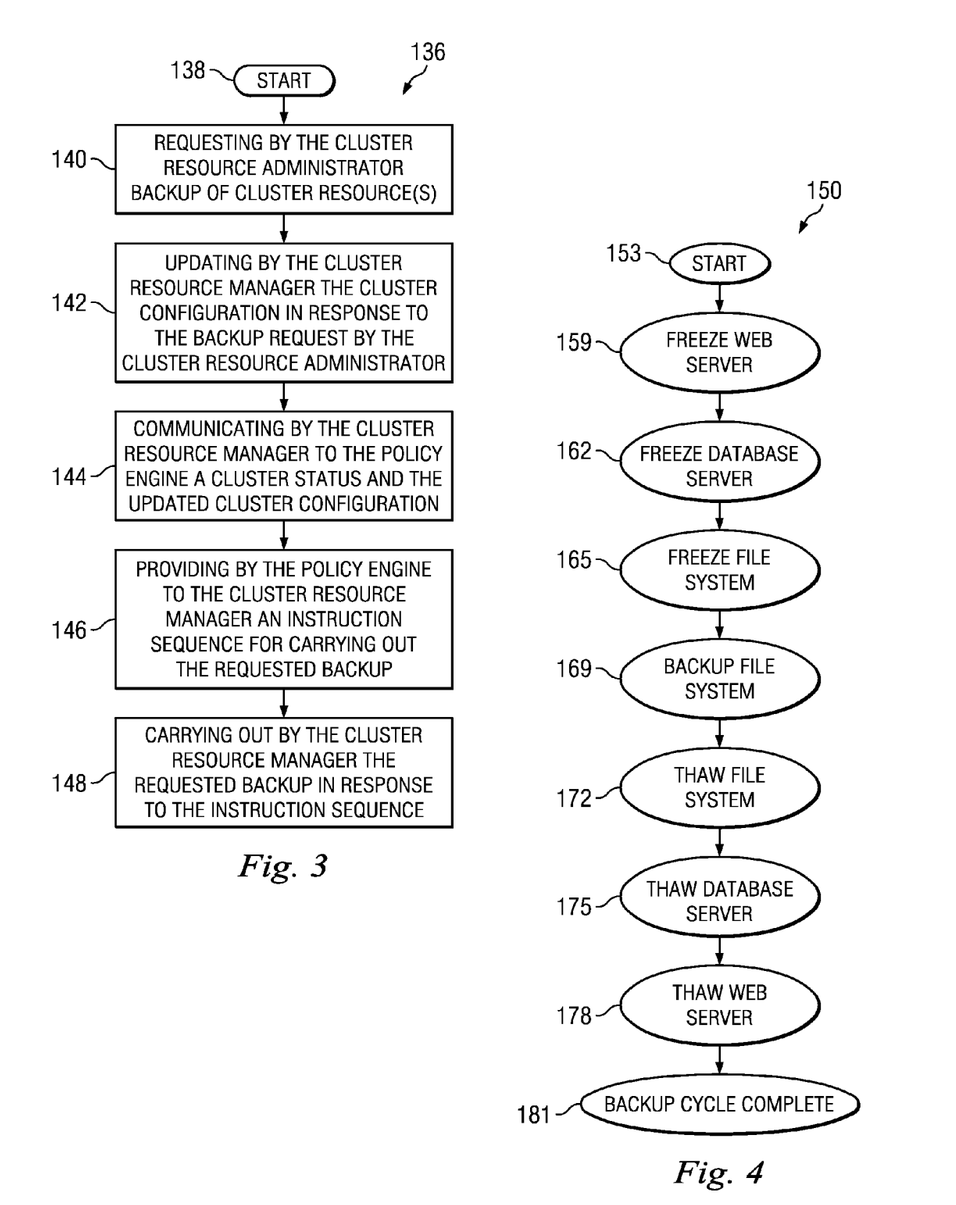
FIG. 3 is a flowchart of a method for implementing a cluster resource backup technique in accordance with one embodiment.
FIG. 4 is a flowchart of a method that is an embodiment of carrying out by the cluster resource manager a backup request (FIG. 3) for a file system that is a resource in the three-tiered service of FIG. 1.

FIG. 3 is a flowchart of an intelligent backup method 136 that is implemented in the BCC system 100 shown in FIG. 1. The intelligent backup method 136 begins at block 138. The method 136 proceeds to block 140 where the cluster resource administrator (not shown) requests backup of a cluster resource or cluster resources. A request by the administrator can be initiated in one of several ways. For example, an administrator may use a user interface, such as a graphical user interface (GUI), to manually initiate an external request for backup. Alternatively, the administrator may use backup software to initiate a backup request that can be manual or automated.

After the cluster resource administrator requests backup of a cluster resource or cluster resources (block 140), the intelligent backup method continues to block 142 where the cluster resource manager 121 updates the cluster configuration in response to the backup request by the cluster resource administrator. In particular, the cluster resource manager 121 updates the cluster configuration to reflect that the particular resource or resources requested by the cluster resource administrator should be backed-up. The intelligent backup method 136 proceeds from block 142 to block 144. At block 144 the cluster resource manager 121 provides to the policy engine 122 the status and updated cluster configuration. The method then advances to block 146 where the policy engine provides to the cluster resource manager 121 an instruction sequence for carrying out the requested backup. The method proceeds from block 146 to block 148 where the cluster resource manager 121 carries out the requested backup in response to the instruction sequence provided by the policy engine 122.

Now consider the intelligent backup method 136 in greater detail for different backup requests of the three-tiered service that runs in the BCC system 100 of FIG. 1. Recall that the three-tiered service includes the web server and database servers running on node 1A, and the file system running on node 2A. Moreover, recall that the database server depends on the file system and the web server depends on both the database server and the file system. This discussion focuses on two different backup requests. First, the discussion focuses on an external request by the cluster resource administrator for backup of the file system (FIG. 4). Then, the discussion focuses on an automated request by the cluster resource administrator for backup of all three resources in the three-tiered service: the web server, database server, and the file system (FIGS. 5-8). For each of these backup requests, blocks 140, 142, 144, and 146 of the intelligent backup method 136 (FIG. 3) are similar and thus will be summarily discussed below. The step (block 148) for carrying out by the cluster resource manager 121 the requested backups in response to the instruction sequence varies depending on the backup request. Therefore, the discussion of these two different backup requests will be explained separately and in greater detail with reference to FIGS. 4-8.

Still referring to FIG. 3, now provided is a more detailed discussion of the intelligent backup method 136. The method 136 begins at block 138 and proceeds to block 140. At block 140 the cluster resource administrator requests backup of cluster resources. For example, when backup of only the file system is requested then at block 140 the method 136 includes requesting by the cluster resource administrator backup of the file system. When backup of all the resources in the three-tiered service is requested then at block 140 the method 136 includes requesting by the cluster resource administrator backup of the web server, database server, and file system resources.

From block 140, the method 136 advances to block 142 where the cluster resource manager updates the cluster configuration in response to the specific backup request. For example, when backup of only the file system is requested then at block 142 the cluster resource manager 121 updates the cluster configuration to indicate that the file system should be backed-up. Likewise, when backup of all the resources in the three-tiered service is requested then at block 142 the cluster resource manager 121 updates the cluster configuration to indicate that the web server, database server, and file system resources should all be backed-up.

After block 142, the method 136 continues to block 144 where the cluster resource manager communicates to the policy engine 122 a cluster status and the updated cluster configuration. Then the method 136 advances to block 146 where the policy engine 122 provides an instruction sequence to the cluster resource manager 121 for carrying out the requested backup. The instruction sequence provided by the policy engine 122 is similar for when backup of only the file system is requested and for when backup of all the resources in the three-tiered service is requested. In particular, recall that the web server resource is dependent on the database server resource, and that the database server resource is dependent on the file system resource. Accordingly, for when either backup of the file system or backup of all the resources in the three-tiered service is requested, it is necessary for the web server to be suspended first, followed by the database server, and then the file system. Therefore, the policy engine 122 which maintains the dependency information relating to the web server, database server, and the file system resources, provides the appropriate instruction sequence (also known as a transition graph) to the cluster resource manager 121. The method 136 proceeds to block 148 after the instruction sequence is received by the cluster resource manager 121. At block 148, the cluster resource manager 121 carries out the requested backup depending on the backup that is requested by the cluster resource administrator (block 140). For example, provided below is a discussion of a particular backup request for only the file system resource running on node 2A.

FIG. 4 is a flowchart that illustrates a method 150 that is an embodiment of block 148 (FIG. 3) for carrying out by the cluster resource manager 121 a backup request for only the file system resource. Recall that the web server resource depends on the database server which in turn depends on the file system resource. Accordingly, the intelligent backup method must sequence suspending and resuming operation of the resources in a specific order to properly backup the file system resource. In particular, the method 150 starts at block 153. The method then continues to block 159 where the cluster resource manager 121 sends a request to the resource agent 126 to freeze the web server that is running on node 1A. The resource agent 126 sends a positive result to the cluster resource manager 121 after the web server freezes. This positive result indicates to the cluster resource manager 121 that the web server has been frozen successfully.

After the cluster resource manager 121 receives the indication that the web server is frozen, the method 150 advances from block 159 to block 162 where the cluster resource manager 121 freezes the database server that is running on node 1A. In particular, the cluster resource manager 121 sends a request to the resource agent 127 to freeze the database server. The resource agent 127 sends a positive result back to the cluster resource manager 121 after the database server freezes. This positive result indicates to the cluster resource manager 121 that the database server has been frozen successfully. After the cluster resource manager 121 receives the indication that the database server is frozen, the method 150 continues to block 165 where the cluster resource manager 121 freezes the file system that is running on node 2A. In particular, the cluster resource manager 121 sends a request to the resource agent 128 to freeze the file system. The resource agent 128 sends a positive result back to the cluster resource manager 121 after the file system freezes. This positive result indicates to the cluster resource manager 121 that the file system has been frozen successfully. At this point in the method 150, all three resources in the three-tiered service have been frozen. Therefore, the method 150 can begin backing up the file system.

Accordingly, the method 150 advances from block 165 to block 169 where the cluster resource manager 121 initiates backup of the file system. The cluster resource manager 121 receives a positive result in response to the file system backup being completed successfully. In the example under discussion, the intelligent backup method must thaw the resources in a specific sequence. In particular, first the file system must be thawed since it is used by both the database and web servers. Therefore, upon receiving an indication that the file system backup has successfully completed, the method 150 continues to block 172 where the cluster resource manager 121 initiates thawing of the file system resource. In particular, the cluster resource manager 121 sends a request to the resource agent 128 to thaw the file system resource. The resource agent 128 sends a positive result back to the cluster resource manager 121 after the file system thaws. This positive result indicates to the cluster resource manager 121 that the file system has been thawed successfully.

The database server is thawed next because it is used by the web server. Therefore, after the cluster resource manager 121 receives the indication that the file system is thawed, the method 150 continues to block 175 where the cluster resource manager 121 thaws the database server that is running on node 1A. In particular, the cluster resource manager 121 sends a request to the resource agent 127 to thaw the database server resource. The resource agent 127 sends a positive result back to the cluster resource manager 121 after the database server thaws. This positive result indicates to the cluster resource manager 121 that the database server has been thawed successfully.

Next the web server can be thawed now that both the file system and the database server have been thawed. Accordingly, the method 150 moves from block 175 to block 178 where the cluster resource manager 121 thaws the web server that is running on node 1A. In particular, the cluster resource manager 121 thaws the web server that is running on node 1A. For example, the cluster resource manager 121 sends a request to the resource agent 126 to thaw the web server resource. The resource agent 126 sends a positive result back to the cluster resource manager 121 after the database server thaws. This positive result indicates to the cluster resource manager 121 that the database server has been thawed successfully. At this point in the method 150, all three resources in the three-tiered service have been thawed and are running in the cluster 102. Therefore, the method 150 advances to block 181 where the backup cycle is complete.

Figures 5, 10:
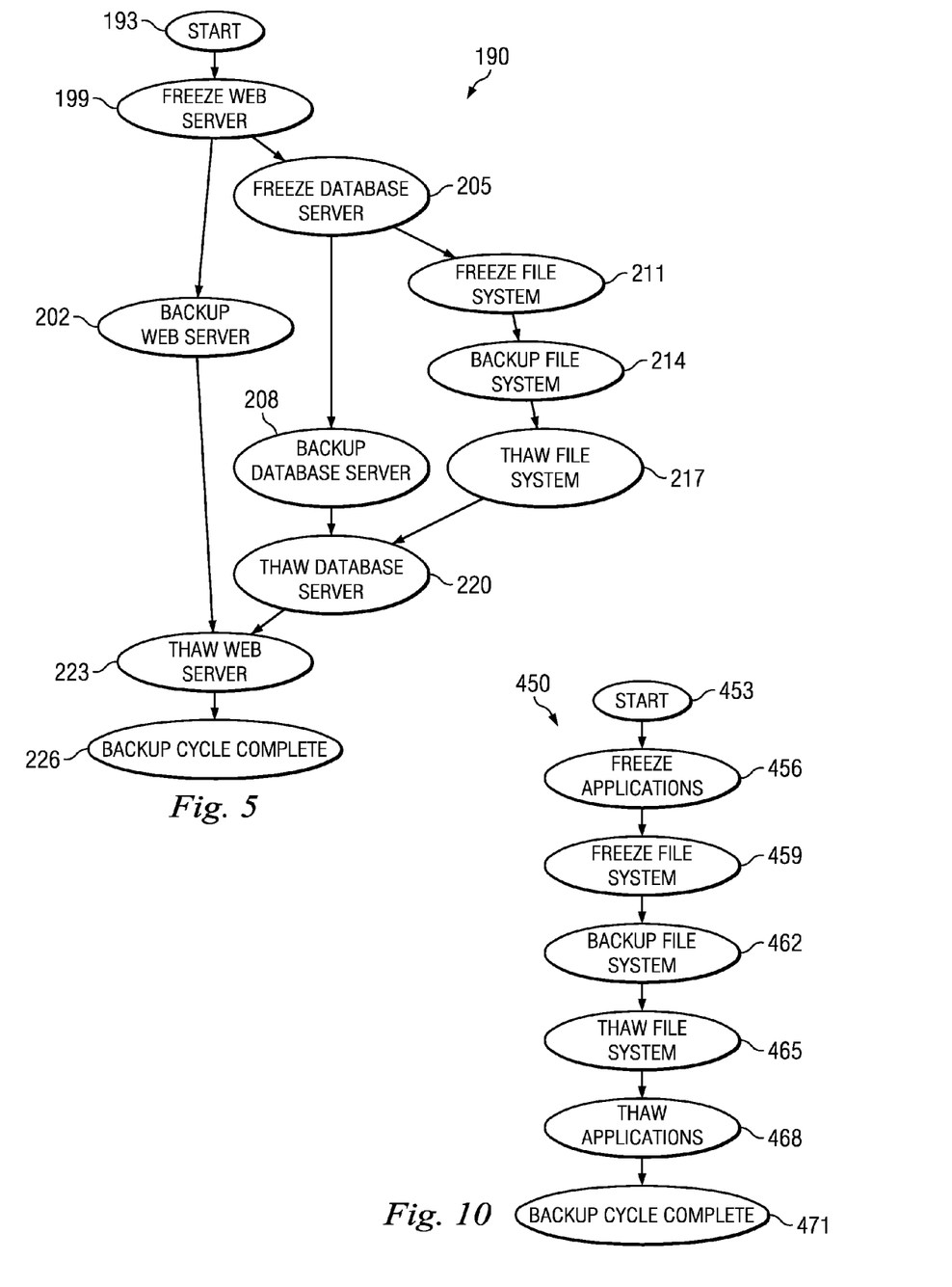
FIG. 5 is a flowchart of a method that is an embodiment of carrying out by the cluster resource manager a backup request (FIG. 3) for all three resources that are in the three-tiered service of FIG. 1.
FIG. 10 is a flowchart of a method that is an embodiment of carrying out by the cluster resource manager a backup request (FIG. 3) for only the file system that is distributed in the cluster system of FIG. 9.

Now refer to FIG. 5 that is a flowchart depicting a method 190 that is an embodiment of block 148 (FIG. 3) for carrying out by the cluster resource manager 121 a backup request for all three resources (web server, database server, and file system) in the three-tiered service implemented in the cluster 102 of FIG. 1. The method 190 starts at block 193. From block 193 the method proceeds to block 199 where the cluster resource manager 121 freezes the web server resource that is running on node 1A. In particular, the cluster resource manager 121 sends a request to the resource agent 126 to freeze the web server. The resource agent 126 sends a positive result back to the cluster resource manager 121 after the web server freezes. This positive result indicates to the cluster resource manager 121 that the web server has been frozen successfully. It is safe to backup the web server resource now that it has been properly frozen and none of the other resources depend on it. Therefore, the method 190 advances from block 199 to block 202 where the cluster resource manager 121 initiates backup of the web server. The cluster resource manager 121 receives a positive result in response to the web server backup being completed successfully.

Also in parallel and simultaneous to the initiation of the web server backup (block 202), the method 190 proceeds from block 199 to block 205 where the cluster resource manager 121 freezes the database server resource that is running on node 1A. In particular, the cluster resource manager 121 sends a request to the resource agent 127 to freeze the database server. The resource agent 127 sends a positive result back to the cluster resource manager 121 after the database server freezes. This positive result indicates to the cluster resource manager 121 that the database server has been frozen successfully. Accordingly, it is safe to backup the database server resource now that it has been properly frozen and the only resource that depends on the database server (the webs server) has also been frozen. Therefore, the method 190 proceeds from block 205 to block 208 where the cluster resource manager 121 initiates backup of the database server. The cluster resource manager 121 receives a positive result in response to the database server backup being completed successfully.

Also in parallel and simultaneous to the initiation of the database server backup (block 208), the method 190 proceeds from block 205 to block 211 where the cluster resource manager 121 freezes the file system resource that is running on node 2A. In particular, the cluster resource manager 121 sends a request to the resource agent 128 to freeze the file system server. The resource agent 128 sends a positive result back to the cluster resource manager 121 after the file system freezes. This positive result indicates to the cluster resource manager 121 that the file system has been frozen successfully. Therefore, at this point in the method all three resources (web server, database server, and the file system) in the three-tiered service have been frozen in the appropriate sequence. Accordingly, the file system can now be safely backed up. Therefore, the method 190 advances from block 211 to block 214 where the cluster resource manager 121 initiates backup of the file system. The cluster resource manager 121 receives a positive result in response to the file system backup being completed successfully.

The method 190 proceeds from block 214 to block 217 after the cluster resource manager 121 receives an indication that the file system back up was completed successfully. At block 217 the cluster resource manager 121 thaws the file system. The file system is the first resource that is thawed because both the web server and database severs depend on the file system. In particular, the cluster resource manager 121 sends a request to the resource agent 128 to thaw the file system resource. The resource agent 128 sends a positive result back to the cluster resource manager 121 after the file system thaws. This positive result indicates to the cluster resource manager 121 that the file system has been thawed successfully and thus, the method 190 can proceed to block 220.

The method block 190 proceeds to block 220 after all three resources (web server, database server, file system) in the three-tiered service have been backed up (blocks 202, 208, 214 respectively), and after the file system has been thawed (block 217). At this point it is safe to thaw the database server since all resources have been backed up and the file system, which the database server depends on, has been thawed in block 217. Therefore, at block 220 the cluster resource manager 121 thaws the database server resource. In particular, the cluster resource manager 121 sends a request to the resource agent 127 to thaw the database server resource. The resource agent 127 sends a positive result back to the cluster resource manager 121 after the database server thaws. This positive result indicates to the cluster resource manager 121 that the database server has been successfully thawed and thus, the method proceeds to block 223.

At block 223 the method 190 has already completed backup of all three resources in the three-tiered service in the cluster 102 (FIG. 1). Moreover, the method 190 has completed thawing the file system (block 217) and the database server resource (block 220), both of which the web server resource depends on. Accordingly, at block 223 it is safe to thaw the web server resource. Therefore, the cluster resource manager 121 thaws the web server resource. In particular, the cluster resource manager 121 sends a request to the resource agent 126 to thaw the web server resource. The resource agent 126 sends a positive result back to the cluster resource manager 121 after the web server thaws. This positive result indicates to the cluster resource manager 121 that the database server has been successfully thawed and thus, the method proceeds to block 226 were the backup of the web server, database server, and file system resources are completed.

Figure 6:
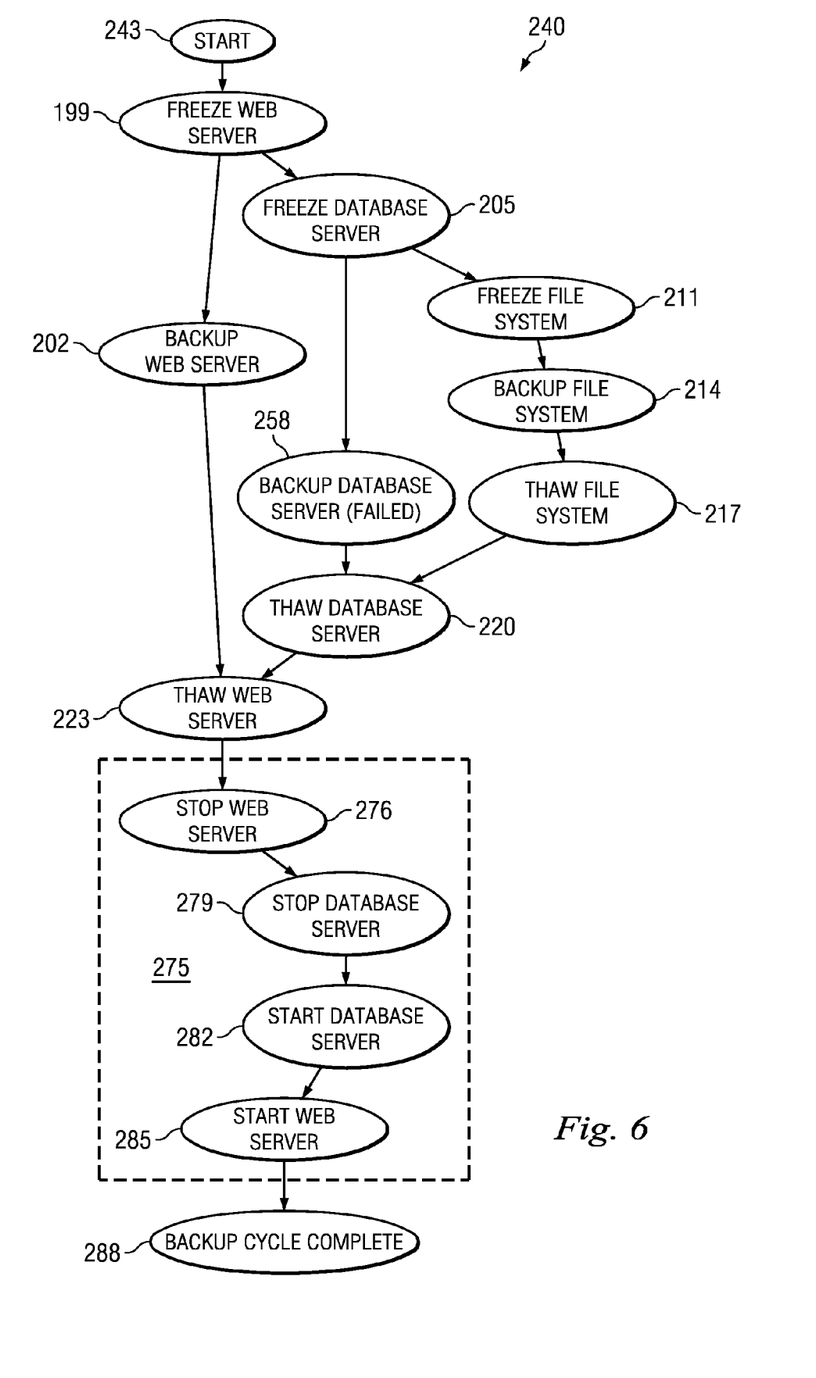
FIG. 6 is a flowchart of a method that is an embodiment of carrying out by the cluster resource manager a backup request (FIG. 3) for all three resources that are in the three-tiered service of FIG. 1, and in which the backup of one of the resources fails.

Now refer to FIG. 6 that is a flowchart depicting a method 240 that is an embodiment of block 148 (FIG. 3) for carrying out by the cluster resource manager 121 a backup request for all three resources (web server, database server, and file system) in the three-tiered service that is implemented in the cluster 102 of FIG. 1. The method 240 is similar to the method 190 of FIG. 5 except that the backup of the database server resource fails and additional recovery steps are necessary to stop, cleanup, and restart the failed database server resource. Identical or equivalent elements are identified by the same reference numerals as shown in FIG. 5, and the following discussion focuses primarily on the differences.

In further detail, the method 240 begins at block 243 and proceeds to backup the three resources in the tiered service in the same manner as described above for the method 190 of FIG. 5. However, block 258 replaces block 208 (database server backup) of FIG. 5. In particular, at block 258 the cluster resource manager 121 attempts to backup the database server resource. However, at block 258 the database server backup fails and the cluster resource manager 121 receives notification of this failure by a negative result. Accordingly, in the method 240 it is desirable to perform a recovery of the database server resource which was unnecessary in the method 190 (FIG. 5) because the database server backup was successful.

Before the recovery process begins, the method 240 advances from block 258 to block 220. Recall that the database server depends on the file system and thus the proper sequence of resuming the resources requires that the file system be thawed before the database server is thawed. Therefore, at block 220 the method 240 waits until the cluster resource manager 121 thaws the file system resource (block 217) before the cluster resource manager 121 thaws the database server. The method 240 then proceeds from block 220 to block 223 where the cluster resource manager 121 thaws the web server resource after the web server has been backed up (block 202). After block 223 all the resources in the three-tiered service have been thawed and thus, the method 240 initiates a recovery section 275 for stopping, cleaning up, and restarting the database server resource that failed during backup at block 258.

The recovery section 275 of the method 240 starts at block 276 where the cluster resource manager 121 first stops the web server resource before stopping the database server since the web server depends on the database server. In particular, the cluster resource manager 121 sends a request to the resource agent 126 to stop (or kill) the web server. The resource agent 126 sends a positive result back to the cluster resource manager 121 after the web server has been stopped. This positive result indicates to the cluster resource manager 121 that the web server has been stopped successfully.

The method 240 then advances from block 276 to block 279 where the cluster resource manager 121 stops the database server. In particular, the cluster resource manager 121 sends a request to the resource agent 127 to stop the database server. The resource agent 127 sends a positive result back to the cluster resource manager 121 after the database server has been stopped. This positive result indicates to the cluster resource manager 121 that the database server has been stopped successfully. Therefore, at this point in the method 240 the web server and database server resources have been stopped and the cleanup process takes place. Thereafter, the method 240 proceeds to block 282 where the cluster resource manager 121 starts the database server. The cluster resource manager 121 starts the database server before the web server because the database server is a dependency of the web server. In particular, the cluster resource manager 121 sends a request to the resource agent 127 to start the database server. The resource agent 127 sends a positive result back to the cluster resource manager 121 after the database server has been started. This positive result indicates to the cluster resource manager 121 that the database server has been started successfully.

From block 282 the method 240 continues on to block 285 where the cluster resource manager 121 starts the web server resource. In particular, the cluster resource manager 121 sends a request to the resource agent 126 to start the web server. The resource agent sends a positive result back to the cluster resource manager 121 after the web server has been started. This positive result indicates to the cluster resource manager 121 that the web server has been started successfully. At that point, the method 240 has completed the recovery section 275 and thus the method 240 advances from block 285 to the block 288 where carrying out by the cluster resource manager 121 the backup of the three resources in the three-tiered service is complete.

Figure 7:
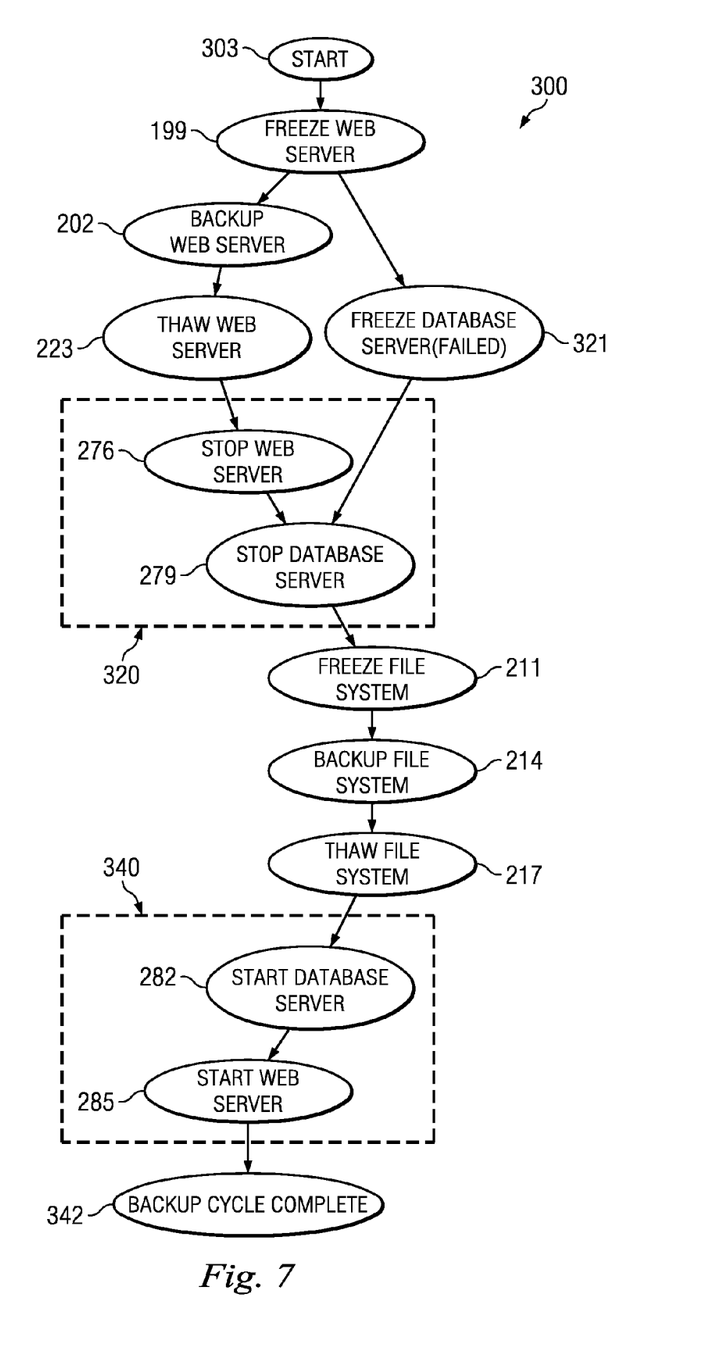
FIG. 7 is a flowchart of a method that is an embodiment of carrying out by the cluster resource manager a backup request (FIG. 3) for all three resources that are in the three-tiered service of FIG. 1, and in which freezing of one of the resources fails.

Now refer to FIG. 7 that is a flowchart depicting a method 300 that is an embodiment of block 148 (FIG. 3) for carrying out by the cluster resource manager 121 a backup request for all three resources (web server, database server, and file system) in the three-tiered service implemented in the cluster 102 of FIG. 1. The method 300 is similar to the method 190 of FIG. 5 except that the freeze of the database server resource fails and additional recovery steps are necessary to stop, cleanup, and restart the failed database server resource. Identical or equivalent elements are identified by the same reference numerals as shown in FIG. 5, and the following discussion focuses primarily on the differences.

In further detail, the method 300 begins at block 303 and proceeds to backup the three resources in the tiered service in the same manner as described above for the method 190 of FIG. 5. However, block 321 replaces block 205 (freeze database server) of FIG. 5. In particular, at block 321 the cluster resource manager 121 attempts to freeze the database server resource however, the database server freeze fails and the cluster resource manager 121 receives notification of this failure by a negative result from the resource agent 127. Accordingly, in the method 300 it is desirable to perform a recovery of the database server resource which was unnecessary in the method 190 (FIG. 5) because the database server freeze was successful. In particular, the failure of the database server freeze means that the file system (a dependency of the database server) cannot yet be frozen until after the database server has been stopped. Also, since the web server depends on the database server, the intelligent backup technique first stops the web server before stopping the database server.

A recovery section 320 starts after the web server resource is thawed (block 276). In particular, the recovery section 320 starts at block 276 after the cluster resource manager 121 thaws the web server resource. At block 276, the cluster resource manager 121 stops (or kills) the web server. This is the first step in the recovery section 320. In that regard, the cluster resource manager 121 has to first stop the web server resource before being able to stop the database server resource because the database server is a dependency of the web server. After the web server is stopped in block 276, the method 300 advances to block 279 where the cluster resource manager 121 stops the database server resource after failure of the database freeze (block 321). The cluster resource manager 121 stops the database server in a manner similar to the manner discussed above with respect to the recovery section 275 in the method 240 of FIG. 6.

The method 300 then advances from block 279 to block 211 where the cluster resource manager 121 freezes the file system resource. This freeze is safe since the web and database servers that depend on the file system have been stopped. At block 211 the cluster resource manager freezes the file system resource in the same manner as discussed above with respect to block 211 in FIGS. 5 and 6. The method 300 then proceeds to block 214 where the cluster resource manager requests backup of the file system in the same manner as discussed above with respect to block 214 in FIGS. 5 and 6. After receiving a positive result the cluster resource manager 121 observes that the file system backup was successful and the method 300 proceeds on to block 217 where the cluster resource manager 217 thaws the file system resource in the same manner as discussed above.

After the cluster resource manager 121 receives a positive result that the file system has been thawed, the method 300 continues to a recovery section 340 that starts at block 282. By block 282 the file system has been backed-up and thawed, while the web server and database server resources have been stopped (back in recovery section 320) to cleanup the failure of the database server. Therefore, with the file system thawed, the cluster resource manager 121 now restarts the database server and the web server in that particular order to make sure of a safe recovery since the database server is a dependency of the web server. Thus, at block 282 the cluster resource manager 121 starts the database server in the same manner as previously discussed. After receiving a positive result from the resource agent 127, the method 300 then moves on to block 285 where the cluster resource manager 121 starts the web server in the same manner as previously described. When the cluster resource manager 121 receives a positive result from the resource agent 126 that the web server has been started, the method 300 proceeds to block 342 where the carrying out by the cluster resource manager 121 the backup of the three resources (web server, database server, and file system) of the three-tiered service is complete.

Figure 8:
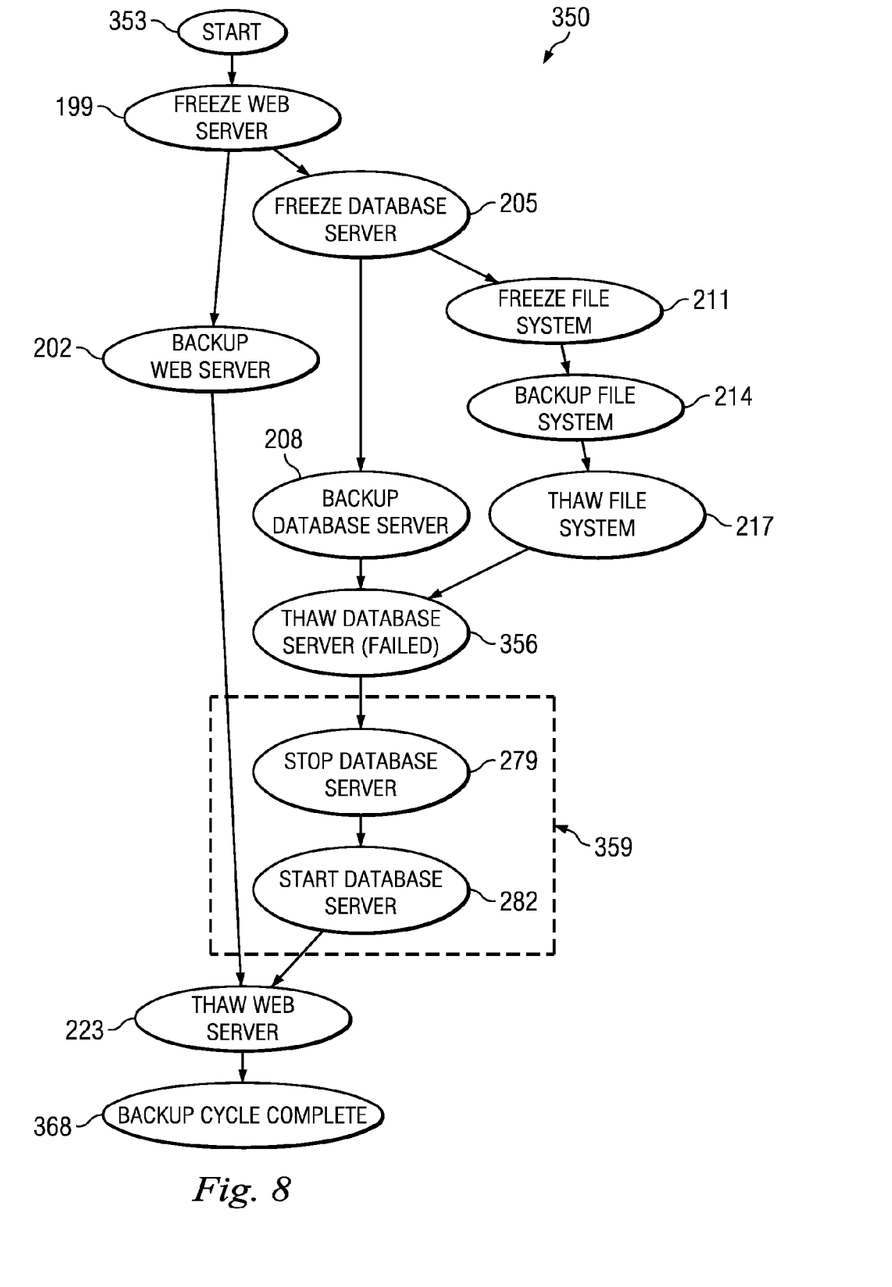
FIG. 8 is a flowchart of a method that is an embodiment of carrying out by the cluster resource manager a backup request (FIG. 3) for all three resources that are in the three-tiered service of FIG. 1, and in which thawing of one of the resources fails.

Now refer to FIG. 8 that is a flowchart that depicts a method 350 that is an embodiment of block 148 (FIG. 3) for carrying out by the cluster resource manager 121 a backup request for all three resources (web server, database server, and file system) in the three-tiered service implemented in the cluster 102 of FIG. 1. The method 350 is similar to the method 190 of FIG. 5 except that the thaw of the database server resource fails and additional recovery steps are necessary to stop, cleanup, and restart the failed database server resource. Identical or equivalent elements are identified by the same reference numerals as shown in FIG. 5, and the following discussion focuses primarily on the differences.

In further detail, the method 350 begins at block 353 and proceeds to backup the three resources in the tiered service in the same manner as described above for the method 190 of FIG. 5. However, block 356 replaces block 225 (thaw database server) of FIG. 5. In particular, at block 356 the cluster resource manager 121 attempts to thaw the database server resource. However, at block 356 the database server thaw fails and the cluster resource manager 121 receives notification of this failure by a negative result from the resource agent 127. Accordingly, in the method 350 it is desirable to perform a recovery of the database server resource which was unnecessary in the method 190 (FIG. 5) because the database server thaw was successful.

The failure of the database server thaw means that the web server, which is dependent on the database server, cannot yet be thawed until after the database server has been properly shut down, cleaned up, and restarted. Moreover, because the web server resource depends on the database server resource, generally the web server resource must be first stopped before the database server is stopped as performed in the recovery section 320 of FIG. 7. However, notice that the web server resource is frozen at block 199 and remains frozen when the failure of the database server occurs (block 356). In this example, the cluster resource manager 121 can perform recovery of the database server resource while the web server resource is frozen. Therefore, the web server need not be first stopped before stopping the database server as was done in the recovery section 320 of FIG. 7. In some cases, the web server may still become affected during the backup method. Therefore, in alternative embodiments a periodic health check (discussed in more detail later) detects that the web server resource is affected so that the cluster resource manager 121 can in turn restart the web server in the appropriate sequence.

A recovery section 359 starts after failure of thawing the database server resource (block 356). In particular, the recovery section 359 starts at block 279 where the cluster resource manager 121 stops (or kills) the database server resource. This is the first step in the recovery section 359. The cluster resource manager 121 stops the database server in a manner similar to the manner discussed above with respect to the recovery section 275 in the method 240 of FIG. 6. After the database server resource is stopped, the cluster resource manager 121 performs clean up the database server. Thereafter, the method 350 advances to block 282 where the cluster resource manager 121 starts the database server resource.

After the cluster resource manager 121 receives a positive result from the resource agent 126 that backup of the web server was successful (block 202) and receives a positive result from the resource agent 127 that the database server start was successful (block 282), then the method 350 proceeds to block 223. At block 223, the cluster resource manager 121 thaws the web server in the same manner as discussed above. After the cluster resource manager 121 receives a positive result that the web server has been thawed, the method 350 continues to block 368 where the carrying out by the cluster resource manager 121 the backup of the three resources (web server, database server, and file system) of the three-tiered service is complete.

Figure 9:
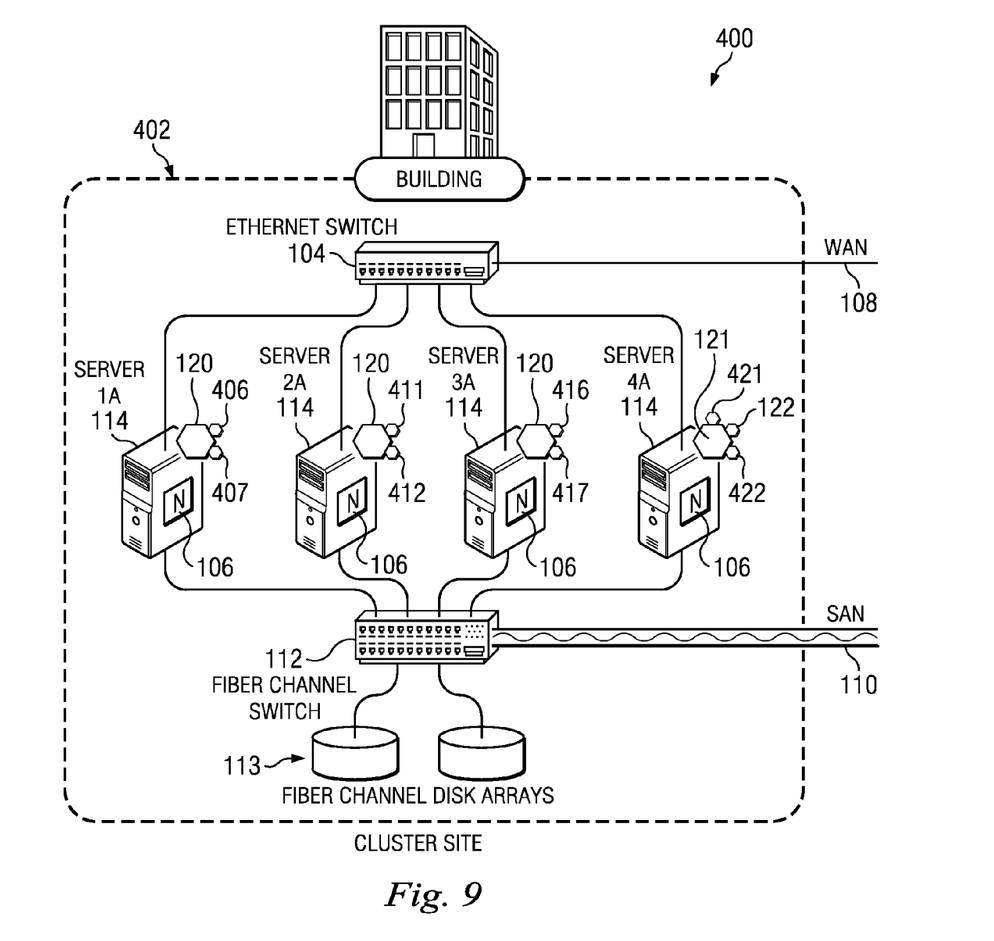
FIG. 9 is a block diagram of a cluster system that runs services on top of a clustered (distributed) file system, that is an alternative to the cluster system of FIG. 1, and in which an embodiment of a cluster resource backup technique may be implemented.

FIG. 9 is a block diagram that illustrates a BCC system 400 comprising an independent cluster 402 that runs services on top of a clustered (distributed) file system. In many respects the cluster 402 is similar to the independent cluster 102 of the BCC system 100 of FIG. 1. Therefore, identical or equivalent elements are identified by the same reference numerals as shown in FIG. 5, and the following discussion focuses primarily on the differences. In the illustrated embodiment, the cluster 402 runs a clustered file system, such as Oracle Cluster File System 2 (OFCS2). In particular, each of the nodes 1A-4A has an application that runs thereon and that depends on a distributed file system. For example, running on node 1A is an application having a resource agent 406. Also running on node 1A is an instance of a distributed file system that has a resource agent 407. The file system is distributed throughout the cluster 402 on nodes 1A-4A. Running on node 2A is another application that is different from the application running on node 1A. The application running on node 2A has a resource agent 411. Also on node 2A is an instance of the distributed file system and a corresponding resource agent 412. Running at node 3A is an application that is different from each of the applications running on nodes 1A, 2A. In that regard, also present on node 3A is a resource agent 416 for the application that runs on node 3A. In addition, an instance of the distributed file system is present on node 3A, as well as a corresponding resource agent 417. Then, running on node 4A is yet another application that is different from each of the applications running respectively on nodes 1A-3A. In particular, present on node 4A is a resource agent 421 for the application that runs on that node. In addition, running on node 4A is an instance of the distributed file system and a corresponding resource agent 422.

In normal operation of the distributed file system, each of the applications running on the nodes 1A-4A depends on the distributed file system. Therefore, each of the applications is first frozen before backup of the distributed file system. Conversely, after backup of the distributed file system, each of the applications are then unfrozen. As discussed above with respect to the three-tiered service of FIG. 1, proper sequencing in the backup technique is necessary for orderly backup within the clustered file system of FIG. 9.

Referring back to FIG. 3, the intelligent backup method 136 can also be implemented in the system 400 of FIG. 9. In that regard, the intelligent backup method 136 is similar for the three-tiered service that runs in the cluster system 100 and the services running on top of the clustered file system in the cluster system 400. Therefore, this discussion focuses primarily on the differences. Distinctions in the backup methods are seen when carrying out by the cluster resource manager 121 the requested backup in response to the instruction sequence provided by the policy engine 122 (block 148 of FIG. 3). In particular, a discussion of carrying out a backup request of the distributed file system now follows.

FIG. 10 is a flowchart that illustrates a method 450 for carrying out by the cluster resource manager 121 a backup request for only the file system that is distributed on nodes 1A-4A. The method 450 starts at block 453. The method then continues to block 456 where the cluster resource manager 121 sends a request to the resource agents 406, 411, 416, and 421 to freeze the applications running on nodes 1A-4A. The resource agents 406, 411, 416, and 421 each send a positive result to the cluster resource manager 121 after the respective applications freeze. Each positive result indicates to the cluster resource manager 121 that the corresponding application has been frozen successfully. After the applications running respectively on nodes 1A-4A have been successfully frozen, the method 450 advances to block 459.

At block 459 the cluster resource manager 121 freezes the clustered file system. In particular, the cluster resource manager 121 sends a request to each of the resource agents 407, 412, 417, and 422 for freezing the corresponding instances of the distributed file system. Each of the resource agents 407, 412, 417, and 422 sends a positive result to the cluster resource manager 121 after the respective instances of the distributed file system are frozen. The positive results indicate to the cluster resource manager 121 that the corresponding application has been frozen successfully. Thereafter, the applications and instances of the distributed file system on each of the nodes 1A-4A are frozen and thus, the cluster resource manager 121 can begin backup of the distributed file system. In that regard, the method 450 proceeds to block 462 where the cluster resource manager 121 backups the distributed file system. In due course, the cluster resource manager 121 receives a positive result from each of the instances (node 1A-4A) of the distributed file system. The positive results indicate to the cluster resource manager 121 that each of the instances of the distributed file system has been backed-up. After indication that each instance of the distributed file system has been backed-up, the method 450 advances to block 465.

At block 465 the cluster resource manager 121 thaws the distributed file system. In particular, the cluster resource manager 121 sends thaw requests to each of the resource agents 407, 412, 417, and 422 that correspond to each of the instances of the distributed file systems on respective nodes 1A-4A. The resource agents 407, 412, 417, and 422 each send a positive result back to the cluster resource manager 121 to indicate that thaw is completed for the corresponding instance of the distributed file system.

After the cluster resource manager 121 receives this indication that the distributed file system has been thawed, the method 450 moves to block 468 where the cluster resource manager 121 thaws the applications. In particular, the cluster resource manager 121 sends a thaw request to each of the resource agents 406, 411, 416, and 421 that correspond to the applications running on respective nodes 1A-4A. The resource agents 406, 411, 416, and 421 each return a positive result back to the cluster resource manager 121 to indicate that the corresponding application has thawed. After the cluster resource manager 121 receives indications that each of the applications on the nodes 1A-4A have been thawed, the method 450 proceeds from block 468 to block 471 where the backup of the clustered file system is complete.

In the clustered file system embodiment of FIG. 9 presently under discussion, the carrying out by the cluster resource manager 121 the requested backup in response to the instruction sequence (block 148 of FIG. 3) is different when there is a failure relating to either the freeze, backup, or thaw applications blocks in the process. In particular, a recovery section is necessary when a failure occurs so that the service recovers from the error appropriately. In this regard, the recovery section of the carrying out by the cluster resource manager 121 the requested backup for the service follows a sequence that is analogous to the recovery sections described above with respect to the three-tiered service shown in the system 100 of FIG. 1. For example, for a backup applications failure, refer back to FIG. 6 that shows a database server backup failure for the three-tiered service running in the system 100 of FIG. 1. The recovery section after an applications backup failure is analogous to the recovery section 275 (FIG. 6). In particular, after the applications are thawed the method under present discussion begins a recovery section. First the cluster resource manager 121 stops each of the applications running on the respective nodes 1A-4A for which backup failed. Cleanup can occur after those particular applications have stopped running. Thereafter, the cluster resource manager 121 restarts those applications and the backup cycle is complete.

Turn now to a brief explanation of an applications freeze failure. When an applications freeze failure occurs the carrying out by the cluster resource manager 121 (FIG. 9) of the requested backup includes a recovery section that is analogous to the recovery sections in the backup method 300 (FIG. 7) for a database server freeze failure in the three-tiered service running in the system 100 of FIG. 1. Referring to FIG. 7, for the embodiment under present discussion the recovery section includes stopping the applications for which applications freeze has failed, much like the method 300 stops the database server resource (block 279) after the database server freeze has failed (block 321). Thereafter, the method under present discussion advances to freeze the clustered file system, backup the clustered file system, thaw out the clustered file system, and then on to the additional steps in another recovery section that is analogous to the recovery section 340 shown in FIG. 7. In particular, after the clustered file system has been thawed it is safe to restart the applications that depend on the clustered file system. Therefore, the cluster resource manager 121 restarts the applications for which freeze has failed, much like the method 300 (FIG. 7) restarts at block 282 the database server for which freeze has failed.

Now turn to a brief explanation of an applications thaw failure. When an applications thaw failure occurs the carrying out by the cluster resource manager 121 (FIG. 9) of the requested backup includes a recovery section that is analogous to the recovery section 359 in the backup method 350 (FIG. 8) for a database server freeze failure in the three-tiered service running in the system 100 of FIG. 1. Referring to FIG. 8, for the embodiment under present discussion the recovery section includes stopping the applications for which thaw has failed, much like the method 350 stops the database server resource (block 279) after the database server thaw has failed (block 356). Thereafter, the cluster resource manager 121 restarts the applications for which thaw has failed, much like the method 350 (FIG. 8) restarts at block 282 the database server for which freeze has failed.

Some of the intelligent backup method embodiments discussed above (FIG. 6-8) include recovery sections that shut down and restart resources in a sequential and orderly manner in response to freeze, backup, and thaw failures. In some embodiments, the cluster resource manager may carry out the recovery sections using a dead man dependency technique such as that described in U.S. patent application Ser. No. 12/495,059, entitled SYSTEM AND METHOD FOR IMPLEMENTING A DEAD MAN DEPENDENCY TECHNIQUE FOR CLUSTER RESOURCES, which is assigned to the assignee of the present application and is hereby incorporated by reference in its entirety. In that regard, responsive to a freeze, backup, or thaw failure the cluster resource manager updates the cluster status to reflect that failure. The updated cluster status and cluster configuration is then sent by the cluster resource manager to the policy engine. In turn, the policy engine identifies a manner of terminating the failed resource and failure recovery. Then the policy engine provides the cluster resource manager with an instruction sequence for causing the identified manner of terminating the first resource and failure recovery (the recovery sections of the intelligent backup methods discussed above). Thereafter, the backup technique thaws resources as needed to complete the backup.

In some embodiments, the cluster resource manager runs periodic heath checks on the resources in the cluster. For example, referring back to the cluster system 100 of FIG. 1 and the intelligent backup technique 136 of FIG. 3, the cluster resource manager 121 may run a periodic health check of the web server, the database server, and the file system resources. In that regard, the cluster resource manager 121 sends a health check monitor request from the policy engine 122. The policy engine 122 monitors the health and status of the web server, database server, and file system resources via the respective resource agents 126-128. In some instances when a health check is performed for a resource that is frozen, the health check will fail. In that case, the cluster resource manager 121 may initiate recovery of the failed resource, or even power down the node, which would result in a failed backup. Moreover, in some instances if a resource is frozen during a health check, there is a chance that it will be thawed depending on the type of health check and expectations of the cluster resource manager 121 and policy engine 122. Therefore, during the intelligent backup technique 136 (FIG. 3) it is desirable to pause the periodic health check requests until the backup process has been completed. For example, the cluster resource manager 121 can disable or suspend the periodic health check. Alternatively, the periodic health check may be run by the cluster resource manager 121 with a different expectation which would refrain from thawing a resource that was determined to be frozen during one of the periodic health checks. In that regard, the intelligent backup technique 136 may properly and orderly freeze, backup, and thaw the web server, database server, and file system resources as needed to ensure a proper backup or snapshot.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for implementing a backup technique in a cluster comprising a plurality of interconnected nodes, at least one of the nodes comprising a cluster resource manager, and at least one of the nodes comprising a policy engine, the policy engine maintaining at least one dependency associated with at least a first resource executing on at least one of the nodes, the method comprising:
   receiving by the cluster resource manager a backup request for the first resource from an administrator of the cluster;
   responsive to receipt of the backup request for the first resource, updating by the cluster resource manager the cluster configuration;
   communicating by the cluster resource manager to the policy engine a cluster status and the updated cluster configuration;
   providing by the policy engine to the cluster resource manager an instruction sequence for carrying out the requested backup, the instruction sequence being based on the dependency associated with the first resource; and
   responsive to receipt of the instruction sequence, carrying out by the cluster resource manager the requested backup of the first resource;
   wherein the policy engine maintains a dependency associated with a second resource with respect to the first resource;
   wherein the second resource depends on the first resource; and
   wherein the carrying out by the cluster resource manager the requested backup of the first resource further includes:
      identifying by the cluster resource manager a failure of one of the first and second resources; and
      responsive to the identification of the failure of the one of the first and second resources, performing by the cluster resource manager recovery of the failure using a dead man dependency technique.

2. The method of claim 1 wherein the carrying out by the cluster resource manager the requested backup of the first resource further includes freezing the first resource before backing up the first resource, and thawing the first resource after backing up the first resource.

3. The method of claim 2,
wherein the carrying out by the cluster resource manager the requested backup of the first resource further includes freezing the second resource before freezing the first resource, and thawing the first resource before thawing the second resource; and
wherein the carrying out by the cluster resource manager the requested backup of the first resource further includes freezing the second resource before backing up the second resource, and thawing the second resource after backing up the second resource.

4. The method of claim 1, further including:
monitoring by the cluster resource manager the first resource; and
suspending by the cluster resource manager the monitoring the first resource during the carrying out by the cluster resource manager the requested backup of the first resource.

5. The method of claim 1, further including:
monitoring by the cluster resource manager the first resource; and
altering by the cluster resource manager expectations of the monitoring during the carrying out by the cluster resource manager the requested backup of the first resource.

6. A system for implementing a backup technique in a cluster comprising a plurality of interconnected nodes, at least one of the nodes comprising a cluster resource manager, and at least one of the nodes comprising a policy engine, the policy engine maintaining at least one dependency with at least a first resource executing on at least one of the nodes, the system comprising:
means for receiving by the cluster resource manager a backup request for the first resource from an administrator of the cluster;
responsive to receipt of the backup request for the first resource, means for updating by the cluster resource manager the cluster configuration;
means for communicating by the cluster resource manager to the policy engine a cluster status and the updated cluster configuration;
means for providing by the policy engine to the cluster resource manager an instruction sequence for carrying out the requested backup, the instruction sequence being based on the dependency associated with the first resource; and
responsive to receipt of the instruction sequence, means for carrying out by the cluster resource manager the requested backup of the first resource;
wherein the policy engine maintains a dependency associated with a second resource with respect to the first resource;
wherein the second resource depends on the first resource; and
wherein the means for carrying out by the cluster resource manager the requested backup of the first resource further includes:
means for identifying by the cluster resource manager a failure of one of the first and second resources; and
responsive to the identification of the failure of the one of the first and second resources, means for performing by the cluster resource manager recovery of the failure;
wherein the means for performing by the cluster resource manager recovery of the failure includes means for performing a dead man dependency technique.

7. The system of claim 6 wherein the means for carrying out by the cluster resource manager the requested backup of the first resource further includes means for freezing the first resource before backing up the first resource, and means for thawing the first resource after backing up the first resource.

8. The system of claim 7,
wherein the carrying out by the cluster resource manager the requested backup of the first resource further includes freezing the second resource before freezing the first resource, and thawing the first resource before thawing the second resource; and
wherein the means for carrying out by the cluster resource manager the requested backup of the first resource further includes means for freezing the second resource before backing up the second resource, and means for thawing the second resource after backing up the second resource.

9. The system of claim 6, further including:
means for monitoring by the cluster resource manager the first resource; and
during the carrying out by the cluster resource manager the requested backup of the first resource, one of means for suspending by the cluster resource manager the monitoring the first resource and altering by the cluster resource manager expectations of the monitoring.

10. A computer program product comprising non-transitory computer-readable medium having stored thereon instructions executable by a computer for implementing a backup technique in a cluster comprising a plurality of interconnected nodes, at least one of the nodes comprising a cluster resource manager, and at least one of the nodes comprising a policy engine, the policy engine maintaining at least one dependency associated with at least a first resource executing on at least one of the nodes, the instructions executable by the computer for causing the computer to:
receive by the cluster resource manager a backup request for the first resource from an administrator of the cluster;
responsive to receipt of the backup request for the first resource, update by the cluster resource manager the cluster configuration;
communicate by the cluster resource manager to the policy engine a cluster status and the updated cluster configuration;
provide by the policy engine to the cluster resource manager an instruction sequence for carrying out the requested backup, the instruction sequence being based on the dependency associated with the first resource; and
responsive to receipt of the instruction sequence, carry out by the cluster resource manager the requested backup of the first resource;
wherein a second resource depends on the first resource and that dependency is maintained by the policy engine; and
wherein the instructions executable by the computer for causing the computer to carry out by the cluster resource manager the requested backup of the first resource further include causing the computer to:
identify by the cluster resource manager a failure of one of the first and second resources; and
responsive to the identification of the failure of the one of the first and second resources, perform by the cluster resource manager recovery of the failure using a dead man dependency technique.

11. The computer program product of claim 10 wherein the instructions executable by the computer for causing the computer to carry out by the cluster resource manager the requested backup of the first resource further include causing the computer to freeze the first resource before backing up the first resource, and to thaw the first resource after backing up the second resource.

12. The computer program product of claim 11,
wherein the instructions executable by the computer for causing the computer to carry out by the cluster resource manager the requested backup of the first resource further include causing the computer to:
freeze the second resource before backing up the second resource and freezing the first resource;
thaw the second resource after backing up the first resource; and
thaw the first resource before thawing the second resource.

13. The computer program product of claim 10,
further including instructions executable by the computer for causing the computer to monitor by the cluster resource manager the first resource; and
wherein the instructions executable by the computer for causing the computer to carry out by the cluster resource manager the requested backup of the first resource further include causing the computer to one of suspend by the cluster resource manager the monitor by the cluster resource manager the first resource and alter by the cluster resource manager expectations of the monitoring.

* * * * *